United States Patent [19]
Kilibwa

[11] Patent Number: 6,001,399
[45] Date of Patent: *Dec. 14, 1999

[54] POLYDEXTROSE AS A FAT ABSORPTION INHIBITOR IN FRIED FOODS

[75] Inventor: Margaret Kilibwa, Niantic, Conn.

[73] Assignee: Cultor Food Science, Inc., Ardsley, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/820,585

[22] Filed: Mar. 19, 1997

[51] Int. Cl.$^6$ .................................................. A21D 13/00
[52] U.S. Cl. .......................... 426/94; 426/549; 426/552; 426/567; 426/804
[58] Field of Search ............................. 426/549, 94, 804, 426/808, 552, 567

[56] References Cited

U.S. PATENT DOCUMENTS

| | | |
|---|---|---|
| H937 | 7/1991 | Sloan . |
| 3,766,165 | 10/1973 | Rennhard . |
| 3,876,794 | 4/1975 | Rennhard . |
| 4,042,714 | 8/1977 | Torres . |
| 4,810,660 | 3/1989 | Willard . |
| 4,814,195 | 3/1989 | Yokoyama et al. . |
| 5,030,468 | 7/1991 | Van Lengerich et al. . |
| 5,217,736 | 6/1993 | Feeney et al. . |
| 5,232,721 | 8/1993 | Polansky . |
| 5,258,199 | 11/1993 | Moore et al. . |
| 5,464,642 | 11/1995 | Villagran et al. . |
| 5,527,556 | 6/1996 | Frippiat et al. . |
| 5,536,526 | 7/1996 | Torres ........................................ 426/62 |
| 5,569,483 | 10/1996 | Timonen et al. . |

OTHER PUBLICATIONS

Effects of PRotein from Different Sources on the Characteristics of Sponge Cakes, Rice Cakes (Apam), Doughnuts and Frying Batters, Suhaila Mohamed, Siti Mawar Md Lajis and Norhashimah Abdul Hamid, "Journal of the Science of Food and Agriculture", 68(3). 1995. 271–277.

Reduced Fat Uptake and Increased Moisture Retention in Yeast–Leavened Doughnuts with Methylcellulose and Hydroxpropyl Methylcellulose. D.A. Bell and L.W. Steinke, Jun. 19, 1992, The Dow Chemical Company.

*Primary Examiner*—Lien Tran
*Attorney, Agent, or Firm*—Hunton & Williams

[57] ABSTRACT

A method for making a fried food product having a reduced fat content and the taste and physical properties of a conventional fried food product includes the steps of forming a dough or batter by combining flour, sugar, a leavening agent, water and polydextrose, and frying the dough or batter. The use of polydextrose as a replacement for sugar, and in combination with flour, a leavening agent and water, produces a dough or batter that yields fried food products having a reduced fat content. In another embodiment of the invention, the polydextrose can be used in combination with fiber, such as oat fiber, and soy protein. In yet another embodiment, polydextrose is used in combination with a cellulose derivative and oat flour. A dough for producing a fried food product having a reduced fat content and the taste and physical properties of a conventional fried food product is also disclosed. The dough includes flour, sugar, a leavening agent, water and polydextrose. Optionally, the dough may include fiber, soy protein, a cellulose derivative or oat flour.

40 Claims, No Drawings

POLYDEXTROSE AS A FAT ABSORPTION INHIBITOR IN FRIED FOODS

BACKGROUND OF THE INVENTION

1. Field of the Invention

This invention relates to a method for making fried food products which are lower in fat than conventional fried food products. In particular, the method involves making a fried food product having reduced fat content by frying a dough including flour, sugar, a leavening agent, water and polydextrose.

2. Description of the Related Art

Numerous medical studies have shown a link between heart disease and a diet high in fat and calories. Also, high fat consumption has been shown to cause obesity and its associated problems. Various public interest health groups have recommended that fat consumption in the human diet be reduced so that no more than 30% of caloric energy is derived from fat. Unfortunately, the fat contained in food products provides much of the desirable eating qualities such as taste, mouthfeel, aroma and texture.

Public interest health groups have been particularly concerned that a significant proportion of the nutritional intake of an average adult is made up of fried foods, which can be quite high in fat as the food tends to absorb the frying fat medium during frying. Nonetheless, consumers continue to demand fried food products as they are generally perceived to be more flavorful. Therefore, the food industry has continually searched for methods of producing fried foods that are both comparable in taste and quality to regular fried foods, but also lower in fat and calories.

Recently, many methods have been proposed to generate fried foods having a lower fat content. Some methods seek to form a film or coating on the raw foodstuff or dough in order to provide a barrier to the uptake of the frying fat medium. Other methods reduce the fat content of fried foods by including a food additive in a dough or batter that reduces the fat content of the fried food product.

For example, U.S. Pat. No. 4,810,660 discloses a process for producing potato patties having less oil content. In the disclosed process, potato shreds are combined with a dry binder that includes retrograded amylose. During frying, the amylose forms a continuous film around the periphery of the patty reducing oil absorption during frying.

Another example of a technique used to minimize the uptake of frying fats during deep frying is disclosed in U.S. Pat. No. 5,232,721. This patent discloses an improved deep frying method wherein foodstuffs are coated with an edible polymer, such as a protein, modified protein, carbohydrate or modified carbohydrate, in order to form a continuous coating that functions as a barrier that minimizes the uptake of the frying fats.

U.S. Pat. No. 5,217,736 discloses a similar process wherein foodstuffs are coated with a continuous protein oil barrier film cast from an aqueous latex suspension of water and soluble hydrophobic protein microspheres. This film is suitable as an oil barrier to reduce oil absorption into the food stuffs.

U.S. Pat. No. 5,569,483 teaches that cellulose derivatives can be incorporated into gelled starch food products having a high water content, such as a batter which is cooked by immersion in hot fat, to get a product having a crisp outer surface and with a lower uptake of the cooking fat.

The invention disclosed in U.S. Pat. No. 5,464,642 relates to a process of making reduced fat fried snacks with more expanded, lighter structures than that of conventional dough-based fried snacks. These reduced fat fried snacks are produced from a sheetable dough which contains calcium carbonate, starch-based flour, hydrolyzed starches, emulsifiers and water.

Studies aimed at reducing the fat content of specific fried food products, such as fried cake donuts, have also been reported. It is known that fat absorption accounts for 15% to 25% of the finished weight of a fried donut. This high fat content in the fried donut has been a concern to those consumers who demand fried food products that are low in fat and calories but also high in taste.

Because of the concerns of health groups and health conscious consumers regarding the high fat content in fried donuts, various methods for reducing the fat content of fried donuts have been investigated. It has been reported that certain reformulated cake donut batters inhibit the absorption of the frying fat medium during frying.

In one study, entitled "Reduced Fat Uptake and Increased Moisture Retention in Yeast-leavened Donuts with Methylcellulose and HPMC" reported by D. A. Bell and L. W. Steinke at the Poster Session, American Association of Cereal Chemists (AACC) Annual Meeting, Minneapolis, Minn. 1995, experiments were conducted using donut batters containing 1% powdered hydroxypropylmethylcellulose (HPMC). The fat content of the finished fried donut formed from the batter having HPMC was reported to be significantly less than the finished fried donut formed from a control batter. Oil reductions of 27% were also achieved in fried donuts containing HPMC and methylcellulose.

In a second study, entitled "Effects of Protein from Different Sources on the Characteristics of Sponge Cakes, Rice Cakes, Doughnuts and Frying Batters" reported in the *Journal of the Science of Food and Agriculture* 68(3) 271–277 1995, soy flour was added to cake donut formulas to reduce fat absorption during frying. The donuts containing soy flour had reduced oil absorption compared to the control donuts.

In spite of the documented efforts to produce a fried food, such as a cake donut, having a lower fat content, there still exists a continuing need to provide additional methods for making reduced fat fried foods that have the flavor attributes and physical properties of conventional fried food products. Often reduced calorie products have an unappetizing dry taste that prevents widespread acceptance by consumers.

Accordingly, it is an object of this invention to provide a method of making a fried food product having a reduced fat content and the taste and physical properties of a conventional fried food product.

It is an additional object of this invention to provide a method of making a fried food product having a reduced fat content and a moisture level comparable to that of a conventional fried food product.

It is another object of this invention to provide a dough or batter that includes additives which inhibit the absorption of the frying fat medium when the dough or batter is fried.

It is a further object of this invention to provide a dough or batter having fat absorption inhibitors that do not significantly affect the eating or quality characteristics of a finished fried product.

It is another object of this invention to provide a dough or batter that includes additives which inhibit the absorption of the frying fat medium and do not lead to a finished product having a reduced moisture level.

It has been discovered that polydextrose, when added to dough or batter mixes, can reduce the absorption of frying fats during frying. It has also been discovered that when polydextrose is added to a dough or batter to inhibit the absorption of a frying fat medium, the eating and quality characteristics of the finished fried product are not significantly affected. In addition, it has been discovered that different combinations of polydextrose, fiber, soy protein, cellulose derivatives and oat flour in a dough or batter mix can result in a synergistic effect, inhibiting the absorption of the frying fat medium during frying and maintaining the eating and quality characteristics of a finished fried food product.

Polydextrose is a randomly bonded condensation polymer of D-glucose with some bound sorbitol and a suitable acid such as citric acid. Polydextrose is odorless, very soluble in water, and has a slight, tart taste. It is known to have uses as a fat substitute, foodstuff bulking agent, browning agent, texturizer, humectant and thickener for use in, for example, reduced-calorie products. Such reduced-calorie products include fat-free cookies, low-fat frozen desserts, reduced-fat peanut butter and fat-free salad dressings. It is believed that polydextrose does not contribute to dental caries, causes minimal gastrointestinal disturbances, and has a caloric value of about 1 calorie per gram.

The United States Food and Drug administration has approved polydextrose as a multipurpose food ingredient for such products as frozen dairy desserts, baked goods and mixes, confections and frostings, salad dressings, gelatins, puddings, and pie fillings, hard candy and soft candy, and chewing gum. Polydextrose has also been approved by various other nations' regulatory bodies for use as a food ingredient.

LITESSE® improved polydextrose FCC is one commercially available form of polydextrose available from Cultor Food Science, which also produces other forms of polydextrose.

SUMMARY OF THE INVENTION

The present invention satisfies the need for a method of making a fried food product with a reduced fat content and the taste and physical properties of a conventional fried food product by providing a method that includes the steps of forming a dough or batter by combining flour, sugar, a leavening agent, water and polydextrose, and frying the dough or batter. The use of polydextrose as a replacement for sugar, and in combination with the flour, leavening agent and water in accordance with the present invention provides fried food products having a reduced fat content. These improved properties are achieved without adverse affect upon organoleptic characteristics of the fried food products. The dough or batter made with the present invention demonstrates good handling properties and the final fried food product is comparable in quality to conventional fried food products fried without polydextrose. Furthermore, the present invention can be used with commonly used dough or batter preparation processes.

The present invention therefore discloses a method of making a fried food product comprising the steps of forming a dough or batter by combining ingredients including flour, sugar, a leavening agent, and water; and frying the dough or batter in a frying fat medium, wherein at least a portion of the sugar of the dough or batter is replaced with an amount of polydextrose effective to reduce the adsorption of the frying fat medium into the fried food product, whereby a reduced fat content fried food product is produced. Preferably, the polydextrose is present in an amount of at least 13 wt % by flour weight, and more preferably in an amount ranging from 13 wt % to 17 wt % by flour weight. In another preferred embodiment, the polydextrose replaces up to 40 wt % of the sugar originally present in the dough or batter, and more preferably replaces from 25 wt % to 40 wt % of the sugar originally present in the dough or batter.

The present invention further discloses a dough or batter composition useful in making fried food product which comprises flour, sugar, a leavening agent, and water, wherein at least a portion of the sugar of the dough or batter is replaced with an amount of polydextrose effective to reduce the adsorption of the frying fat medium into the fried food product. Preferably, the polydextrose is present in an amount of at least 13 wt % by flour weight, and more preferably in an amount ranging from 13 wt % to 17 wt % by flour weight. In another preferred embodiment, the polydextrose replaces up to 40 wt % of the sugar originally present in the dough or batter, and more preferably replaces from 25 wt % to 40 wt % of the sugar originally present in the dough or batter.

In one embodiment, polydextrose is used in combination with fiber, such as oat fiber. Advantageously, this combination can also include soy protein. The combination of polydextrose and oat fiber in a dough or batter produces a finished fried product with a lower fat content and eating and quality characteristics comparable to a conventional fried food product.

In yet another embodiment, polydextrose is used in combination with a cellulose derivative and oat flour. The combination of polydextrose, a cellulose derivative and oat flour shows some synergistic results producing a fried product with a lower fat content and eating and quality characteristics comparable to a conventional fried food product. For example, cake donuts produced from a batter including polydextrose, a cellulose derivative and oat flour exhibited a 36% reduction in fat content and a 10% increase in moisture content over conventional donuts. Equally as significant, the reduced fat cake donuts produced nearly equivalent scores on tests of eating and quality characteristics compared with conventional donuts.

These and other features, aspects, objects, and advantages of the present invention will be become better understood upon consideration of the following detailed description and appended claims.

DESCRIPTION OF THE PREFERRED EMBODIMENTS

Experiments were conducted in order to evaluate the effectiveness of polydextrose in reducing fat absorption in fried foods. Specifically, two studies were performed to evaluate LITESSE® polydextrose for its effectiveness in reducing fat absorption in cake donuts, a fried food that has reached widespread consumption. The studies are detailed in Examples 1 and 2.

EXAMPLE 1

This example shows that polydextrose is effective in reducing fat absorption in fried foods. Furthermore, it shows that other food additives such as oat fiber and soy protein can be used in combination with polydextrose to further enhance the fat absorption inhibiting effects of polydextrose and to increase the overall quality of the reduced fat fried food product.

Experimental Procedure

Cake donuts were prepared according to the general formula and procedure outlined in Table I. Specific variations of the general formulation are outlined in Table II, where the weight in grams of each of the ingredients is given. It can be seen from Table II that six cake donut formulations were used in the study of Example 1.

TABLE I

Cake Donut Formula

| Ingredients | Bakers % (% by flour wgt.) | Total % |
|---|---|---|
| Stage 1 | | |
| Flour, pastry | 50.0 | 21.9 |
| Flour, bread | 50.0 | 21.9 |
| Granulated sugar | 38.7 | 17.0 |
| Dextrose | 1.9 | 0.8 |
| Salt | 2.2 | 1.0 |
| Nonfat dry milk | 7.0 | 3.1 |
| Egg yolk solids | 4.6 | 2.0 |
| Baking soda | 1.5 | 0.7 |
| Sodium acid pyrophosphate (SAPP 43) | 2.0 | 0.9 |
| Litesse ® Polydextrose | Variable | Variable |
| Oat fiber | Variable | Variable |
| Soy protein | Variable | Variable |
| Nutmeg | 0.24 | 0.1 |
| Mace | 0.15 | 0.1 |
| Stage 2 | | |
| All-Purpose shortening | 6.05 | 2.7 |
| Vanilla | 0.5 | 0.2 |
| Water | 63.4 | 27.8 |

Mixer: Hobart A-200 with 12 qt. bowl and paddle agitator.
Mixing: Blend Stage 1 dry ingredients 1 minute on Speed 1. Add Stage 2 liquids and shortening, incorporate, then mix 1 minute on Speed 1 and 2 minutes on speed 2.
Batter Temperature: 76° F. (24.5° C.)
Bench Time: 10 minutes at ambient temperature.
Fryer: Belshaw DONUT ROBOT 42 automatic donut fryer.
Depositor Setting: 1.4–2.0.
Donut Cutter Size: 1.5 inch diameter.
Weight of Fried Donut: 37–40 grams per unit (after cooling).
Frying Temperature: 375° F. (190° C.).
Cool: 30 minutes at ambient conditions.
Measure: Weight and volume by rapeseed displacement.
Analyze: Moisture and fat content.
Evaluate: External, internal and eating quality characteristics.

formulation for the production of a reduced fat cake donut. It can be seen that this formulation varies from the control formulation by the use of 160 grams of polydextrose in place of a corresponding amount of granulated sugar. Hence, this formulation is identified in the Tables as a 25% sugar replacement with polydextrose formulation. Formulation No. 3 includes 256 grams of polydextrose in place of the corresponding amount of granulated sugar. Hence, Formulation No. 3 is identified in the Tables as a 40% sugar replacement with polydextrose formulation. In Formulations 4, 5 and 6, the polydextrose is maintained at a 40% replacement level for the sugar. Formulation No. 4 further includes 33.1 grams of oat fiber, which corresponds to 2% by flour weight. Formulation No. 5 includes 33.1 grams of oat fiber and 33.1 grams of soy protein, which both correspond to 2% by flour weight. Formulation No. 6 further includes 33.1 grams of soy protein, which corresponds to 2% by flour weight.

Cake donut batters were prepared according to the procedure listed in Table I. Subjectively evaluated characteristics of the batter were then noted. The specific gravity of the batters was also measured. Donuts were then shaped and fried according to the procedure listed in Table I.

After frying and cooling, the weight and volume of the finished cake donuts were measured by rapeseed displacement. Subjective evaluations were also carried out on the day of frying and included: an evaluation of the external appearance, such as formation of a star in the donut center, cracking on the bottom surface, and color variation; an evaluation of the internal appearance and physical properties such as grease soakage, and evenness of internal grain; and an evaluation of the eating and quality characteristics.

The moisture and fat content of the finished cake donuts was also analyzed. The moisture content of the donuts was measured by air drying and then according to a modification of standard American Association of Cereal Chemists (AACC) No. 44-40 for Stage 2 (70° C. drying overnight in place of 98°–100° C. for 5 hours). The fat content of the finished cake donuts was estimated using Soxhlet ether extraction AACC Method No. 30-25. The fat content was

TABLE II

Cake Donut Formula Sheet
Sugar replacement with polydextrose, oat fiber and soy protein

| INGREDIENT | 1 Control | 2 25% repl. polydextrose | 3 40% repl. polydextrose | 4 40% repl. polydextrose oat fiber | 5 40% repl. polydextrose oat & soy | 6 40% repl. polydextrose soy protein |
|---|---|---|---|---|---|---|
| Pastry flour | 827 | 827 | 827 | 827 | 827 | 827 |
| Bread flour | 827 | 827 | 827 | 827 | 827 | 827 |
| Granulated sugar | 640 | 480 | 384 | 384 | 384 | 384 |
| Polydextrose | — | 160 | 256 | 256 | 256 | 256 |
| Oat fiber | — | — | — | 33.1 | 33.1 | — |
| Soy protein | — | — | — | — | 33.1 | 33.1 |
| Dextrose | 32 | 32 | 32 | 32 | 32 | 32 |
| Salt | 36 | 36 | 36 | 36 | 36 | 36 |
| Nonfat dry milk | 116 | 116 | 116 | 116 | 116 | 116 |
| Egg yolk solids | 76 | 76 | 76 | 76 | 76 | 76 |
| Baking soda | 24 | 24 | 24 | 24 | 24 | 24 |
| Acid salt, SAPP 43 | 33 | 33 | 33 | 33 | 33 | 33 |
| Nutmeg | 4 | 4 | 4 | 4 | 4 | 4 |
| Mace | 2.5 | 2.5 | 2.5 | 2.5 | 2.5 | 2.5 |
| Emulsified shortening | 100 | 100 | 100 | 100 | 100 | 100 |
| Vanilla | 8 | 8 | 8 | 8 | 8 | 8 |
| Water | 1048 | 1048 | 1048 | 1048 | 1048 | 1048 |

Formulation No. 1 is a control cake donut batter formulated from ingredients commonly used in the commercial production of cake donuts. Formulation No. 2 is a modified measured on an as-consumed and a 0% moisture basis. The finished cake donuts were also measured for specific gravity, volume, and specific volume. The results of all of the objective and subjective measurements of the finished cake donuts are summarized in Tables III, IV and V.

TABLE III

Objective Measurements of Cake Donuts

| Formulation | Specific Gravity | Volume (cc) | Specific Volume (cc/g) |
|---|---|---|---|
| 1 - Control | 1.1178 | 113 | 2.55 |
| 2 - 25% Litesse ® | 1.1068 | 133 | 2.78 |
| 3 - 40% Litesse ® | 1.1048 | 118 | 2.59 |
| 4 - 40% Litesse ®, 2% Oat fiber | 1.1325 | 119 | 2.74 |
| 5 - 40% Litesse ®, 2% Oat fiber, 2% Soy protein | 1.1031 | 124 | 2.64 |
| 6 - 40% Litesse ®, 2% Soy protein | 1.1349 | 133 | 2.79 |

TABLE IV

Subjective Measurements of Cake Donuts

| Formulation | External Appearance | Internal Appearance | Total Score |
|---|---|---|---|
| 1 - Control | 25.50 | 49.50 | 75.00 |
| 2 - 25% Litesse ® | 25.00 | 49.25 | 74.25 |
| 3 - 40% Litesse ® | 24.50 | 44.00 | 68.50 |
| 4 - 40% Litesse ®, 2% Oat fiber | 23.50 | 47.25 | 70.75 |
| 5 - 40% Litesse ®, 2% Oat fiber, 2% Soy protein | 20.50 | 39.75 | 60.25 |
| 6 - 40% Litesse ®, 2% Soy protein | 21.75 | 40.50 | 62.25 |

TABLE V

Fat and Moisture Content of Cake Donuts

| Formulation | % Fat "As Consumed" | % Fat 0% Moisture Basis | Moisture (%) |
|---|---|---|---|
| 1 - Control | 28.06 | 36.78 | 23.72 |
| 2 - 25% Litesse ® | 30.93 | 38.59 | 19.85 |
| 3 - 40% Litesse ® | 26.52 | 33.75 | 21.45 |
| 4 - 40% Litesse ®, 2% Oat fiber | 23.73 | 30.77 | 22.87 |
| 5 - 40% Litesse ®, 2% Oat fiber, 2% Soy protein | 23.10 | 29.80 | 22.49 |
| 6 - 40% Litesse ®, 2% Soy protein | 24.84 | 32.03 | 22.45 |

Analysis of the Results of the Experiments

It can be seen from Table III that the incorporation of LITESSE® polydextrose into the cake donut formulations had an effect on the specific gravity and volume of the finished cake donuts. Specific gravity decreased as the level of LITESSE® polydextrose was increased in the cake donut batter. When oat fiber and soy protein were added individually to the cake donut batters having LITESSE® polydextrose, the specific gravity also increased. However, when the oat fiber and soy protein were added together in combination with the LITESSE® polydextrose to the cake donut batter formulation, specific gravity decreased. Therefore, it appears that the incorporation of LITESSE® polydextrose into the cake donut batter leads to a finished cake donut product having more air incorporated into the structure. Thus, the incorporation of LITESSE® polydextrose into the cake donut batter yields a lighter, more expanded finished cake donut as is preferred by most consumers.

It can also be seen from Table III that the volumes of the cake donuts were improved over the control formulation when LITESSE® polydextrose was added to the cake donut batter. The volumes of the finished cake donut were greatest when 25% LITESSE® polydextrose was added to the cake donuts and when 40% LITESSE® polydextrose was added in combination with soy protein. Again, this demonstrates that the addition of polydextrose to the cake donut batter results in a finished cake donut with an expanded structure.

A summary of the results of the subjective measurements of the finished cake donuts is shown in Table IV. The individual variables used to determine the scores given in Table IV are shown in Table VI. It can be seen from Table VI that the external appearance of the finished cake donut was evaluated with respect to star formation, symmetry, and crust color. The internal appearance of the finished cake donut was measured with respect to fat soakage, grain, texture, crumb color, aroma, flavor, and mouth feel. A total score based on a perfect score of 100 was totalled for each cake donut batter formulation in Table VI. The scores are summarized in Table IV.

TABLE VI

System: Donut Robot    Cake Type: Donuts
Experimental Variable: Sugar Replacement using Polydextrose, Soy Protein, Oat Fiber

| Eating or Quality Characteristic | Maximum Score | 1 Control | 2 25% polydextrose replacement | 3 40% polydextrose replacement | 4 40% polydextrose replacement w/oat fiber | 5 40% polydextrose replacement w/oat fiber w/soy protein | 6 40% polydextrose replacement w/soy protein | Characteristic Description |
|---|---|---|---|---|---|---|---|---|
| Star formation | (15) | 13 | 13 | 13 | 12 | 10 | 11 | A. partial<br>B. none |
| Symmetry | (5) | 4.5 | 4<br>slB | 4<br>slB | 4<br>slB | 3<br>B | 3.25<br>B | A. non-uniform<br>B. split bottom |
| Crust Color | (10) | 8 | 8 | 7.5<br>slA | 7.5<br>slA | 7.5<br>slA | 7.5<br>slB | A. light<br>B. dark<br>C. same (as control) |
| External | (30) | 25.5 | 25 | 24.5 | 23.5 | 20.5 | 21.75 | |

TABLE VI-continued

System: Donut Robot    Cake Type: Donuts
Experimental Variable: Sugar Replacement using Polydextrose, Soy Protein, Oat Fiber

| Eating or Quality Characteristic | Maximum Score | 1 Control | 2 25% polydextrose replacement | 3 40% polydextrose replacement | 4 40% polydextrose replacement w/oat fiber | 5 40% polydextrose replacement w/oat fiber w/soy protein | 6 40% polydextrose replacement w/soy protein | Characteristic Description |
|---|---|---|---|---|---|---|---|---|
| Appearance | | | | | | | | |
| Fat Soakage | (10) | 8 | 8 | 8 | 8 | 8 | 6 | |
| Grain | (10) | 8 slightly compact | 7.5 slC | 6.5 BC | 7.5 slighty compact slB | 5 BC | 7.25 BslC | A. Coarse B. holes C. open D. not uniform E. tunnels F. thick cell G. horizontal fissures H. too compact |
| Texture | (15) | 11.5 slC, F moisture core | 12 F moisture core | 11.5 slC, F moisture core | 11.5 slC, F moisture core | 8 C | 12 F fat core | A. dry B. crumbly C. doughy D. harsh E. not resilient F. core G. fragile H. weak |
| Crumb Color | (5) | 4.5 | 4.25 sl yellow | 4 sl yellow | 4.25 sl yellow | 3.75 sl yellow | 4.25 sl yellow | A. light B. dark C. dull D. not uniform |
| Aroma/Flavor | (15) | 13 | 13 | 12 slB | 12 slB aroma | 11 doughy taste | 9 slB aroma | A. strong B. lack of C. foreign D. soda E. musty F. bland |
| Mouthfeel | (15) | 12.5 slB | 12.5 sl gritty | 10 E | 12 | 12 | 8 E | A. dry B. tough C. mealy D. gummy E. greasy |
| Internal | (70) | 49.5 | 49.25 | 44 | 47.25 | 39.75 | 40.5 | |
| Appearance | | | | | | | | |
| TOTAL SCORE | (100) | 75 | 74.25 | 68.5 | 70.75 | 60.25 | 62.25 | |
| Average Volume: cm | | 113 | 133 | 118 | 119 | 124 | 133 | |
| Specific Volume: cm³/g | | 2.55 | 2.78 | 2.59 | 2.74 | 2.64 | 2.79 | |
| Batter Temp.: ° F. | | 72.5 | 75 | 76 | 77 | 75.5 | 76 | |
| Specific Gravity | | 1.1178 | 1.1068 | 1.1048 | 1.1325 | 1.1031 | 1.1349 | |
| Floor Time: min. | | 35 | 30 | 30 | 45 | 30 | 30 | |
| Depositor Setting | | 2.25 | 2.25 | 2.25 | 2.25 | 2.25 | 2.25 | |

It can be seen from Table IV that the total quality of donuts was similar to the control donut formulation when 25% LITESSE® polydextrose was used as a replacement for the sugar. As the level of LITESSE® polydextrose in the donuts was increased, quality decreased. However, the addition of oat fiber with the polydextrose improved the donut quality over the formulations having polydextrose alone. When soy protein was added to the donuts, quality also decreased. The lowest quality donuts were obtained when oat fiber and soy protein were both added in combination with the highest level of LITESSE® polydextrose. Quality decreased in the donuts due to internal and external parameters which included: poor star formation, split bottoms, grain that was opened and contained holes, doughy texture and taste, slightly yellow crumb color, and greasy mouth feel.

The results of the fat and moisture content analyses of the finished cake donuts are shown in Table V. It can be seen that the fat content of the cake donuts was highest in the control batter formulation and the formulation including 25% LITESSE® polydextrose replacement for the sugar. With the addition of higher levels of LITESSE® polydextrose, oat flour, and soy protein, the fat content of the finished caked donuts decreased. The moisture content of the cake donuts decreased with the addition of LITESSE® polydextrose alone. However, moisture was restored similar to that of the control formulation with the addition of oat fiber.

Summary of the Results of Example 1

Example 1 shows that polydextrose can inhibit the fat absorption of fried foods without significant decrease in product quality. Furthermore, the addition of oat fiber or soy protein can enhance the fat absorption inhibiting action of the polydextrose. In fact, it can be seen in Tables IV and V that when 40% of the granulated sugar is replaced with polydextrose, and oat fiber is added to the formulation, donuts of quality similar to that of the control formulation were obtained but the fat content of the finished cake donut was significantly less than the control. Therefore, fried foods formulated from batters or doughs including polydextrose and other additives such as oat fiber and soy protein will have a reduced fat content along with taste and physical properties comparable to that of a conventional fried food product.

EXAMPLE 2

This example further shows that polydextrose is effective in reducing fat absorption in fried foods. Furthermore, it shows that other food additives such as cellulose derivatives and soy flour can be used in combination with polydextrose to further enhance the fat absorption inhibiting effects of polydextrose and to increase the overall eating and quality characteristics of the reduced fat fried food product.

Experimental Procedure

Control cake donuts were prepared according to the formulations and methods described in Table VII. A modified formulation for the production of reduced fat cake donuts was used and is described in Table VIII. It can be seen from a review of Table VIII that the modified cake donut formulation included LITESSE® polydextrose, a cellulose derivative hydroxypropylmethylcellulose (HPMC) commonly sold under the trademark METHOCEL F-50, and soy flour. Further formula variations, described below, were carried out depending on the product quality after initial testing. The experimental results from all of the formula variations are given in Table IX.

TABLE VII

Control Cake Donut Formula

| Ingredients | Bakers % (% by flour wgt.) | Total % |
|---|---|---|
| Stage 1 | | |
| Pastry Flour | 75 | 31.8 |
| Bread Flour | 25 | 10.6 |
| Granulated Sugar | 40 | 17.0 |
| Dextrose | 2 | 0.8 |
| Salt | 2.25 | 1.0 |
| Nonfat Dry Milk | 7.25 | 3.1 |
| Egg Yolk Solids | 9.375 | 4.0 |
| Baking Soda | 1.5 | 0.6 |
| Sodium Acid pyrophosphate, SAPP 40 | 2.0625 | 0.9 |
| Nutmeg | 0.25 | 0.1 |
| Mace | 0.15625 | 0.1 |
| Stage 2 | | |
| All-Purpose Shortening | 6.25 | 2.6 |
| Vanilla | 0.5 | 0.2 |
| Water | 64.25 | 27.2 |

Mixer: Hobart A-200 with 12 qt. bowl and paddle agitator.
Mixing: Blend Stage 1 dry ingredients 1 minute on Speed 1. Add Stage 2 liquids and shortening, incorporate, then mix 1 min on Speed 1 and 2 min. on speed 2.
Batter Temp: 75° F. (24.5° C.).
Bench Time: 10 minutes at ambient temperature.
Fryer: Belshaw DONUT ROBOT 42 automatic donut fryer.
Depositor: 1.4–2.0.
Donut Cutter: 1.5 inch diameter.
Wt of Fried Donut: 37–40 grams per unit (after cooling).
Frying Temp: 375° F. (190° C.).
Cool: 30 minutes at ambient conditions.
Measure: Weight and volume by rapeseed displacement.
Analyze: Moisture and fat content.
Evaluate: External, internal and eating quality characteristics.

TABLE VIII

Modified Cake Donut Formula

| Ingredients | Bakers % (% by flour wgt.) | Total % |
|---|---|---|
| Stage 1 | | |
| Pastry Flour | 47.71 | 21.9 |
| Bread Flour | 39.22 | 18.0 |
| Granulated Sugar | 21.80 | 10.0 |
| Dextrose | 1.74 | 0.8 |
| Salt | 2.20 | 1.0 |
| Nonfat Dry Milk | 6.54 | 3.0 |
| Egg Yolk Solids | 4.36 | 2.0 |
| Baking Soda | 1.52 | 0.7 |
| Sodium Acid Pyrophosphate, SAPP 43 | 2.00 | 0.9 |
| Litesse ® Polydextrose | 13.73 | 6.3 |
| Methocel F-50 ® HPMC | 1.31 | 0.6 |
| Soy Flour | 13.10 | 6.0 |
| Nutmeg | 0.22 | 0.1 |
| Mace | 0.22 | 0.1 |
| Stage 2 | | |
| All-Purpose Shortening | 5.90 | 2.7 |
| Vanilla | 0.44 | 0.2 |
| Water | 56.00 | 25.7 |

Mixer: Hobart A-200 with 12 qt. bowl and paddle agitator.
Mixing: Blend Stage 1 dry ingredients 1 minute on Speed 1. Add Stage 2 liquids and shortening, incorporate, then mix 1 min on Speed 1 and 2 min. on speed 2.
Batter Temp: 76° F. (24.5° C.).
Bench Time: 10 minutes at ambient temperature.
Fryer: Belshaw DONUT ROBOT 42 automatic donut fryer.
Depositor: 1.4–2.0.
Donut Cutter: 1.5 inch diameter.
Weight of Fried Donut: 37–40 grams per unit (after cooling).
Frying Temp: 375° F. (190° C.).
Cool: 30 minutes at ambient conditions.
Measure: Weight and volume by rapeseed displacement.
Analyze: Moisture and fat content.
Evaluate: External, internal and eating quality characteristics.

Cake donuts were prepared under controlled conditions. Donut batters were subjectively evaluated during processing and viscosity was measured using the Brookfield viscometer. The batter depositor was set to produce donuts of approximately equal weight. Fried donuts were subjectively evaluated for external appearance, internal appearance, and eating and quality characteristics on the day after frying.

The moisture content of the donuts and the total fat content of the donuts were measured by two stage drying oven method and Soxhlet extraction respectively (AACC Standard methodology).

Results and Discussion

Several preliminary frying tests were carried out in order to estimate the quality potential of the modified formula variations. These products were not measured for moisture and fat content, but only subjectively evaluated for acceptable or unacceptable quality characteristics. The preliminary tests included production of the modified test formulation with variations in water content, level of added cellulose derivative and leavening. The modified test formula, with no variations, produced a thick batter with varying degrees of quality. An increase in added water improved the quality of the finished reduced fat donut, particularly the star formulation, but those donuts were relatively dense and tough as compared to the control donuts. When higher amounts of water were added to the dough formulations, longer floor times prior to frying were required.

Continued testing was carried out wherein formula variations were more critically evaluated and fat and moisture content were measured on donuts of reasonable quality standards. Those formula variations are included in Table IX. The control formulation of Table VII was of good quality with sealed bottom crust (formulas 1, 8 and 13 of Table IX). Top and bottom crusts were slightly uneven and the bottom was slightly darker than the top crust after frying. There was a good star formation in the center of the control donut and the ringed portion was bold and well formed. The average fat content of donuts prepared with the control formula of Table VII was 29.5%±2.1% on a 0% moisture basis.

The modified batter formulation of Table VIII (formula 2 of Table IX) produced batters that were relatively thick and required 20 minutes floor time prior to processing. The donuts produced using this modified test formulation were darker than the control formula and had poor and variable star formation in the donut center. These donuts had comparably dense and compact internal grain. These donuts had a fat content of 17.6% on a 0% moisture basis, which was about a 40% reduction in total fat compared to the control donut. Clearly, the fat absorption inhibiting effects of polydextrose are shown when comparing the fat content of the control donut made from the formulation of Table VII and the reduced fat donut made from the Formulation of Table VIII.

In view of the finding that the use of polydextrose in the formulation of Table VIII (formulation 2 of Table IX) reduced fat absorption in the fried cake donuts, further variations of the modified formulation of Table VIII were prepared in order to determine a formulation that optimized eating and quality characteristics while also reducing fat content in the fried cake donut.

In order to improve the dense firm textural characteristics of donuts from the modified formula, the level of egg white was reduced and lecithin was added (formulation 3 of Table IX). These donuts were similar to donuts from the modified formula but were slightly lighter in color. Donuts from formulation 3 had a fat content of 24.6% on a 0% moisture basis, which is approximately a 17% reduction from the control donut of Table VII.

An attempt was made to further reduce the fat content of donuts produced from the modified batter formulation of Table VIII by reducing the fat added to the batter formula. In formulations 4 and 5 of Table IX, the shortening was reduced by 75% and 50% respectively and in each, a commercial emulsifier was added to the formulations at approximately 0.5% and 1.0% respectively. This formula variation produced donuts that were too thick to process and were, therefore, not tested further. Clearly, this attempt at further reducing the fat level of the finished donut by reducing the shortening in the batter was unsuccessful.

Formulation 6 of Table IX was prepared with increased levels of batter water and a reduced level of METHOCEL F-50 brand HPMC in order to reduce batter viscosity and improve processing characteristics. In formulation 6, there was a very good star formation in the donut center but the ring portion of the donut was over-expanded forming a balled appearance. The bottom of this donut split during frying and the donut shell was dark in color. Bottom cracking theoretically increases fat absorption during frying. Donuts from formula 6 had fat content equal to that of the control formula. It is probable that the decreased level of HPMC in this formulation led to an increase in fat content over the modified donut formulation of Table VIII.

The amount of water added to the donut batter was further increased to again improve viscosity and machining characteristics (formula 7 of Table IX). Donuts were similar in subjectively evaluated characteristics and in fat content to those prepared with formula 6, which had a fat content similar to the control donut. Therefore, it appears that the reduced level of HPMC adversely affected the fat absorption inhibition of these modified donut formulations.

Formula 8 of Table IX was a repeat of the control formula described in Table VII.

The level of added soy flour was reduced in formula 9 of Table IX, and the level of added batter water kept at that used in formula 7 of Table IX. Quality characteristics of these donuts were good. The donuts were slightly larger in size than other test variations and the color of the donut was more even. These donuts were similar to the control donut, and fat content was even higher than the control. It is well established by these results that the soy flour reduced fat absorption.

With the exception of the formula 13 of Table IX (which was a control formula as in Table VII), the remaining test formulations were prepared with no added dextrose in order to reduce the high level of browning that occurred during frying the test formulations. The level of METHOCEL F-50 brand HPMC was increased in formula 10 to a level of 0.7% of flour weight, and the added batter was also increased. These donuts had a good star formation and relatively good symmetry. Donuts were lighter than those produced with formula 6, however, they were still slightly darker than the donuts made with the control formula. The bottom surface of the donuts split. Fat content of donuts made with formula 10 of Table IX was approximately 10% lower than the control. It appears that the increased level of HPMC further reduced the fat absorption of the donuts. It is expected that similar food grade cellulose derivatives such as carboxymethylcellulose, methylcellulose, hydroxyethylcellulose, and hydroxypropylcellulose would have a similar effect.

Formula 11 of Table IX was prepared with reduced egg white and added lecithin, maintaining the high level of added batter water and deleting the added dextrose. However, during processing, the LITESSE® polydextrose was dissolved in water prior to mixing in order to fully dissolve the crystalline structure. This was done in order to eliminate glassy spots developing on the surface of the donuts in all other test formulations. These donuts were similar in quality to previous formulas and dissolving the LITESSE® polydextrose did not get rid of the glassy spots.

In formula 12 of Table IX, the level of HPMC was returned to the level used in the original modified formula of Table VIII, egg white solids were increased, and the level of added water was increased. The fat content of these donuts was reduced by 23% in comparison to the control donut.

Formula 13 of Table IX was a repeat of the control donut formula of Table VII.

The final two formula variations, formula 14 and 15 of Table IX, included an increase in soy flour, and in formula 15, the level of added water was also increased. In formula 14, the soy flour was substituted for bread flour. These donuts had a good star formation and were slightly darker than the control donuts. The internal characteristics were compact and slightly firm as compared to the control. Reduction in fat absorption as compared to the control donut was 31.3% and 27.2% respectively, indicating that the increase in soy flour enhances the fat absorption inhibiting effects of the polydextrose.

Because the finished cake donuts produced from the batters of Formulas 14 and 15 were significantly lower in fat, the eating and quality characteristics of the finished cake donuts of formulas 13, 14 and 15 were extensively studied. The results of these tests of the eating and quality characteristics are shown in Table X.

TABLE IX

Objectively Measured Characteristics of Cake Donuts

| Formulation Number | Viscosity cps | Floor Time min | % Moisture | Fat Content, % As Consumed | Fat Content, % 0% Moisture Basis |
|---|---|---|---|---|---|
| 1 (control) | 205,500 | 20 | 17.50 | 25.30 | 30.50 |
| 2 | 305,500 | 20 | 25.30 | 13.14 | 17.59 |
| 3 | 442,000 | 10 | 23.02 | 18.99 | 24.66 |
| 4 | Donuts too thick to process | | | | |
| 5 | Donuts too thick to process | | | | |
| 6 | 482,000 | 15 | 22.91 | 23.71 | 30.76 |
| 7 | 342,000 | 15 | 24.18 | 22.44 | 29.60 |
| 8 (control) | 270,000 | 20 | 22.86 | 23.86 | 30.94 |
| 9 | 302,500 | 20 | 20.67 | 28.62 | 36.08 |
| 10 | 445,000 | 15 | 25.28 | 19.75 | 26.43 |
| 11 | 390,000 | 20 | 25.59 | 17.70 | 23.78 |
| 12 | 407,500 | 15 | 23.58 | 17.25 | 22.57 |
| 13 (control) | 245,000 | 30 | 24.92 | 20.32 | 27.06 |
| 14 | 390,000 | 10 | 27.39 | 13.08 | 19.00 |
| 15 | 412,000 | 13 | 28.42 | 13.94 | 19.47 |

TABLE X

Cake Type: Donuts
Experimental Variable: Formulation 14 - increased soy flour 2% by flour wgt. (decreased bread flour 1% by flour wgt.)
15 - same as 14 but with 2% more water

| Eating or Quality Characteristic | Maximum Score | 13 Control | 14 inc. soy | 15 inc. water | Characteristic Description |
|---|---|---|---|---|---|
| Star Formation | (15) | 13 tight | 12 sl. open | 13 tight | A. partial B. none |
| Symmetry | (5) | 4.5 | 4.5 | 4.5 | A. non-uniform C. split bottom |
| Crust Color | (10) | 8 | 8 | 7.75 slB | A. light B. dark C. same (as control) |
| External Appearance | (30) | 25.5 | 24.5 | 25.25 | |
| Fat Soakage | (10) | 6 | 8 | 8 | |
| Grain | (10) | 8 | 6 H | 6 H | A. coarse B. hole C. Open D. not uniform E. tunnel F. thick cell G. horizontal fissures H. too compact |
| Texture | (15) | 13 | 12 firm | 12 firm | A. dry B. crumble C. doughy D. harsh E. not resilient F. core G. fragile H. weak |
| Crumb Color | (5) | 4.5 | 4.5 | 4.5 | A. light B. dark C. dull D. not uniform |
| Aroma/Flavor | (15) | 13 | 12 firm | 12 firm | A. strong B. lack of C. foreign D. soda E. musty F. bland |
| Mouthfeel | (15) | 11 E | 12 slB | 12 slB | A. dry B. tough C. mealy D. gummy E. greasy |
| Internal Appearance | (70) | 55.5 | 54.5 | 54.5 | |
| TOTAL SCORE | (100) | 81 | 79 | 79.75 | |
| Spreads/3 donuts: in. | | 9 | 8⅝ | 8¼ | |
| Stack Height/3 donuts: in | | 3¾ | 3¾ | 3¾ | |
| Batter Temp.: °F. | | 75 | 79 | 80 | |
| Batter viscosity: cps | | 245,000 | 390,000 | 412,000 | |

TABLE X-continued

Cake Type: Donuts
Experimental Variable: Formulation 14 - increased soy flour 2% by flour
wgt. (decreased bread flour 1% by flour wgt.)
15 - same as 14 but with 2% more water

| Eating or Quality Characteristic | Maximum Score | Formulation Number | | | Characteristic Description |
|---|---|---|---|---|---|
| | | 13 Control | 14 inc. soy | 15 inc. water | |
| Floor Time: min. | | 30 | 10 | 13 | |
| Depositor Setting | | 2.25 | 2.25 | 2.25 | |

As detailed above, formula 13 was a control donut produced from the formulation of Table VII, formula 14 was a modification of the formula of Table VIII wherein the soy flour was increased 2% by flour weight and the bread flour was decreased accordingly, and formula 15 was a modification of formula 14 wherein 2% more water was added. Therefore, the modified donut batters of formula 14 and 15 included 13.73% by flour weight LITESSE® polydextrose, 15.1% by flour weight soy flour, and 1.31% by flour weight HPMC.

Referring to Table X, it can be seen that the tests of the eating and quality characteristics of the finished cake donuts of formulas 13, 14, and 15 show that the reduced fat donuts made from formulas 14 and 15 have virtually the same eating and quality scores as the control donuts. For example, the total score on all of the eating and quality characteristics of the control donut is 81 out of 100, while the reduced fat donuts of formulas 14 and 15, which showed a fat content reduction of 30% from the control donuts, have total scores of 79 and 79.75 respectively. In fact, the reduced fat donuts have virtually the same scores for the aroma and flavor characteristic (12) as the control donut (13). Furthermore, the reduced fat donuts do not have the greasy mouthfeel reported for the control donuts. It can also be seen from Table IX that the donuts of formulas 14 and 15 have a higher moisture level than the control donut indicating that the reduced fat donuts do not have the dry taste often present in reduced fat food products.

Summary of the Results of Example 2

Example 2 further shows that polydextrose can inhibit the fat absorption of fried foods while maintaining product quality. Furthermore, the addition of a cellulose derivative and oat flour with the polydextrose can enhance the fat absorption inhibiting action of the polydextrose, increase the moisture content, and help produce a finished fried food product having eating and quality characteristics comparable to a conventional fried food product. In fact, it can be seen from Table X that when polydextrose, HPMC and oat fiber are added to a donut batter formulation, finished donuts of significantly reduced fat content and of quality equal to that of conventional donuts can be obtained. Therefore, fried foods formulated from batters or doughs including polydextrose and other additives such as cellulose derivatives and oat flour will have a reduced fat content and increased moisture content along with taste and physical properties comparable to that of a conventional fried food product.

Thus, it is seen that a method for reducing the fat absorption in fried food products is provided. The disclosed method has advantages over prior art methods as the finished fried food product has a reduced fat content, improved moisture levels and taste and physical properties comparable to that of a conventional fried food product.

Although the present invention has been described in considerable detail with reference to certain preferred embodiments, one skilled in the art will appreciate that the present invention can be practiced by other than the preferred embodiments, which have been presented for purposes of illustration and not of limitation. Therefore, the spirit and scope of the appended claims should not be limited to the description of the preferred embodiments contained herein.

What is claimed is:

1. A method of making a fried food product comprising the steps of:
   forming a dough or batter for a fried food product by combining ingredients, said ingredients comprising flour, sugar, a leavening agent, and water; and
   frying the dough or batter in a frying fat medium,
   wherein at least a portion of the sugar of the dough or batter is replaced with an amount of polydextrose effective to reduce the adsorption of the frying fat medium into the fried food product, whereby a reduced fat content fried food product is produced.

2. The method of claim 1 wherein the polydextrose is added in an amount of at least 13 percent of flour weight.

3. The method of claim 1 further comprising the step of:
   forming the dough or batter into a cake donut shape before frying the dough or batter whereby the fried food product resulting from the method is a cake donut.

4. The method of claim 1 wherein the dough or batter further includes fiber.

5. The method of claim 4 wherein the fiber is oat fiber.

6. The method of claim 5 wherein the oat fiber is added in an amount of about 2 percent of flour weight.

7. The method of claim 4 wherein the dough or batter further includes soy protein.

8. The method of claim 7 wherein the soy protein is added in an amount of about 2 percent of flour weight.

9. The method of claim 1 wherein the dough or batter further includes soy protein.

10. The method of claim 9 wherein the soy protein is added in an amount of about 2 percent of flour weight.

11. The method of claim 1 wherein the dough or batter further includes a cellulose derivative selected from the group consisting of carboxymethylcellulose, methylcellulose, hydroxyethylcellulose, hydroxypropylcellulose and hydroxypropylmethylcellulose.

12. The method of claim 11 wherein the cellulose derivative is hydroxypropylmethylcellulose.

13. The method of with claim 12 wherein the hydroxypropylmethylcellulose is added in an amount of from about 1 percent to about 2 percent of flour weight.

14. The method of claim 11 wherein the flour is a mixture of flours including soy flour.

15. The method of claim 14 wherein the soy flour is added in an amount of from about 13 percent of flour weight to about 15 percent of flour weight.

16. The method of claim 1 wherein the polydextrose is present in an amount ranging from 13 percent to 17 percent by flour weight.

17. The method of claim 1 wherein the polydextrose replaces up to 40 wt % of the sugar in the dough or batter.

18. The method of claim 1 wherein the polydextrose replaces from 25 wt % to 40 wt % of the sugar in the dough or batter.

19. A method of making a fried cake donut comprising the steps of:
    forming a batter for a fried cake donut by combining ingredients, said ingredients comprising pastry flour, bread flour, sugar, a leavening agent, water, soy flour, and hydroxypropylmethylcellulose;
    forming the batter into a cake donut shape; and
    frying the batter in a frying fat medium,
    wherein at least a portion of the sugar of the batter is replaced with an amount of polydextrose effective to reduce the adsorption of the frying fat medium into the fried cake donut, whereby a reduced fat content fried cake donut is produced.

20. The method of claim 19 wherein the soy flour is added in an amount of from about 13 percent of flour weight to about 15 percent of flour weight.

21. The method of claim 20 wherein the hydroxypropylmethylcellulose is added in an amount of from about 1 percent to about 2 percent of flour weight.

22. The method of claim 19 wherein the polydextrose is present in an amount ranging from 13 percent to 17 percent by flour weight.

23. The method of claim 19 wherein the polydextrose replaces up to 40 wt % of the sugar in the dough or batter.

24. The method of claim 19 wherein the polydextrose replaces from 25 wt % to 40 wt % of the sugar in the dough or batter.

25. A dough or batter used for making a fried food product, the dough comprising: flour, sugar, a leavening agent, and water,
    wherein at least a portion of the sugar of the dough or batter is replaced with an amount of polydextrose effective to reduce the adsorption of frying fat medium into the fried food product when the dough or batter is fried in the frying medium.

26. The dough or batter of claim 25 wherein the fried food product is a cake donut.

27. The dough or batter of claim 25 further comprising oat fiber.

28. The dough or batter of claim 27 wherein the oat fiber is added in an amount of about 2 percent of flour weight.

29. The dough or batter of claim 28 further comprising soy protein.

30. The dough or batter of claim 29 wherein the soy protein is added in an amount of about 2 percent of flour weight.

31. The dough or batter of claim 25 further comprising soy protein.

32. The dough or batter of claim 31 wherein the soy protein is added in an amount of about 2 percent of flour weight.

33. The dough or batter of claim 25 further comprising a cellulose derivative selected from the group consisting of carboxymethylcellulose, methylcellulose, hydroxyethylcellulose, hydroxypropylcellulose and hydroxypropylmethylcellulose.

34. The dough or batter of claim 33 wherein the cellulose derivative is hydroxypropylmethylcellulose.

35. The dough or batter of claim 34 wherein the hydroxypropylmethylcellulose is added in an amount of from about 1 percent to about 2 percent of flour weight.

36. The dough or batter of claim 33 wherein the flour is a mixture of flours including soy flour.

37. The dough or batter of claim 36 wherein the soy flour is added in an amount of from about 13 percent of flour weight to about 15 percent of flour weight.

38. The dough or batter of claim 25 wherein the polydextrose is present in an amount ranging from 13 percent to 17 percent by flour weight.

39. The dough or batter of claim 25 wherein the polydextrose replaces up to 40 wt % of the sugar in the dough or batter.

40. The dough or batter of claim 25 wherein the polydextrose replaces from 25 wt % to 40 wt % of the sugar in the dough or batter.

* * * * *